Patented June 20, 1933

1,914,723

UNITED STATES PATENT OFFICE

ALPHONS O. JAEGER, OF MOUNT LEBANON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PURIFICATION OF IMIDES

No Drawing. Application filed January 17, 1930. Serial No. 421,601.

This invention relates to the purification of sublimable imides, and more particularly to the purification of sublimable aromatic imides.

In the past sublimable imides, such as phthalimide, its homologues and substitution products, naphthalimide, its homologues and substitution products, have been purified by sublimation and other means which involve high cost or are inadequate. Many of the impurities in the imides are adsorbable or catalytically oxidizable; for example, they are colored impurities which can be readily adsorbed by suitable adsorbents. In some cases there are impurities which are capable of forming adsorbable condensation products, or are easily destroyed by catalytic oxidation. It is an added feature of the present invention that such impurities can be removed by the present process.

According to the present process the imide or reagents which react at operating temperatures to form the imide as, for example, ammonium phthalate or ammonia and phthalic anhydride in the case of phthalimide, ammonium naphthalate in the case of naphthalimide, are vaporized and the vapors are passed over a suitable adsorbent, which may or may not be a condensation or oxidation catalyst but which preferably is such a catalyst, although the invention is not limited to this specific type of adsorbent but generally includes treatment with any suitable adsorbent or catalyst. The temperature at which the adsorbent or catalyst is maintained during the process will vary with the different materials and in general can be varied through a wide range, but, of course, it should ordinarily be kept at a temperature sufficiently above the condensation point of the imide itself. In general solids which are rich in pores or capillarities are the most suitable and such compounds containing aluminum oxide or similar oxides which favor condensation are especially effective. Among the best adsorbent catalysts are base exchange bodies, silicious or non-silicious, diluted or undiluted with materials rich in capillaries, such as kieselguhr, colloidal $SiO_2$, metal oxides, and the like. These base exchange bodies, which may advantageously contain aluminum oxide in their molecule and are usually of microporous, honeycomb-like structure, form very effective adsorbents and catalysts for the present invention and preferably their derivatives, which are obtained either by replacing exchangeable bases with others, especially those which are not strong alkalies, by base exchange or bringing about reaction between the base exchange body and compounds containing anions which react therewith to form the so-called salt-like bodies, are also effective and can be used instead of the simple base exchange bodies. Products from base exchange bodies which have been acid leached to remove part or all of the exchangeable bases with or without removing some or all of the non-exchangeable basic constituents of the nucleus are very effective.

Polysilicates or complex metal oxide compounds such as polyoxyhydroxymetal compounds which are prepared for components similar to those used in the preparation of artificial base exchange bodies under reaction conditions which are neutral or acid to litmus instead of under conditions which are neutral or alkaline to phenolphthalein, possess many of the valuable characteristics of the base exchange bodies and these non-base exchanging silicates or metal oxide complexes are well suited for use in the present process.

Compounds containing aluminum oxide, such as bauxite or the highly porous complex aluminum oxide known in the trade as "alumina gel" are among the most effective. "Alumina gel" and similar aluminum adsorbents are particularly effective in removing colored impurities from the imides and may, therefore, be considered as the preferred class of adsorbents. Other porous materials such as earthenware granules, silica gel, suitable types of activated carbon, etc. may effectively be used alone or with the adsorbents referred to above. Zinc carbonate ores, pyrolusite, siderite, etc. are also useful. The porous bodies may also be coated or impregnated with solution of salts or oxides which are catalytically effective in the condensation or oxidation of impurities, particularly in the sublimation of imides which contain condensable impurities. The oxidation catalysts can be the usual type, such as oxides and compounds of the metals of the fifth and sixth group of the periodic system.

The purification may take place at any temperatures within the range in which the imide is stable. In general the higher temperatures are desirable where high output is required.

Where adsorbents are used, of course, they gradually become charged with the relatively non-volatile impurities which have been adsorbed and must, therefore, be periodically regenerated. In use it is of course normally preferable to have two parallel towers filled with the adsorbent so that one tower can be used while the adsorbent in the other tower is being regenerated. The regeneration may be effected by burning out the impurities by calcining or air oxidation processes at elevated temperatures where the adsorbent is not damaged by such temperatures or where any change in the character of the adsorbent does no harm as in the case of some zinc carbonate ores which on regeneration lose their carbon dioxide but are otherwise not adversely affected.

Where the impurities are volatile with superheated steam, they may be distilled out by this means which has the advantage that part at least of the impurities can be recovered where they have sufficient commercial value to make this profitable. Instead of using a parallel arrangement of the adsorbent towers, of course, a single tower may be used with provision for adding fresh adsorbent at the top and removing spent adsorbent from the bottom. Such continuous processes are very efficient. The adsorbent may also be enclosed in portions of the tower which are removable as a whole, as, for example, in suitable metal baskets, which facilitates regeneration of the adsorbent.

The purification has been described above with air as the carrier gas, and where the temperatures are not too high and the purified material is not readily oxidized air is a very suitable carrying medium. The invention, however, is not limited to the use of air and other carrier gases may be used, such as mixtures of nitrogen and oxygen containing a lower percentage of oxygen than air, nitrogen, carbon dioxide, superheated steam, etc. It is frequently desirable, especially where a carrier gas other than air is used, to recirculate part or all of the carrier gas after the purified material has condensed out. This procedure reduces wastes of the carrier gas and conserves part of the heat.

The invention will be described in connection with the following specific examples:

Example 1

Crude phthalimide from technical air-oxidation phthalic anhydride is sublimed with air at a temperature between 230 and 280° C. and the vapors passed over lumps of "alumina gel". The temperature of the "alumina gel" should not be low enough to permit condensation of the imide and may, if desired, be considerably higher than the subliming temperature, but ordinarily it is convenient to maintain it at the subliming temperature or at most a few degrees above After passing through "alumina gel", the phthalimide is condensed out in a condenser. The product is snow white and of high purity. The "alumina gel" gradually becomes colored and after many weeks of use becomes saturated with impurities. When it is sufficiently saturated so that it no longer effectively removes impurities it can be regenerated by calcination with air. Instead of purifying crude phthalimide, crude nitrophthalimide or chlorphthalimide or other derivatives may be purified in the same manner, the conditions remaining unchanged.

Instead of using "alumina gel", bauxite may be used, but it is not quite as effective and, therefore, larger amounts are required. Other metal oxide gels, such as those prepared by the reaction of salts and metallates of the amphoteric metals under reaction conditions which are neutral or acid to litmus may be used. The gels may contain oxy- or hydroxy-compounds of a single metal or of a plurality of metals.

Example 2

Crude ammonium phthalate, prepared, for example, by treating a phthalic acid solution with ammonia or treating an alkali metal phthalate with an amonium salt, is dried and sublimed under the conditions described in Example 1. The imide is formed in a nascent state, for the most part before the temperature is high enough to vaporize the imide, and is purified by the adsorbent. A snow white imide is obtained in the condenser and the product is in every way comparable with that obtained by subliming the pre-formed imide.

Substituted imides such as nitro-, chlor-, or other substituted imides can be prepared as described in this example using the ammonium salt of the corresponding substituted acid.

Example 3

Crude naphthalimide is sublimed at a temperature of 230 to 280° C. and the vapors passed over an "alumina gel", bauxite, or a zeolite prepared by the reaction of potassium aluminate and potassium waterglass, and then treated with an iron salt to introduce iron by base exchange. Preferably the zeolite may be diluted with a porous diluent such as kieselguhr, "Celite" brick refuse, and the like. Snow white naphthalimide condenses out of the gas stream after passing through the adsorbent in the condenser, and the adsorbent gradually becomes colored and can be regenerated as described in Example 1.

*Example 4*

Crude phthalimide prepared from crude air-oxidation phthalic anhydride is vaporized with air in the proportion of 1:15 and passed over a catalyst containing aluminum vanadate or polyvanadate at 320–370° C. The impurities are oxidized and the purified imide is substantially unattacked. Instead of using aluminum vanadates, other suitable oxidation catalysts may be employed.

It will be noted that the process of the present invention depends upon the fact that the impurities in the imide are selectively adsorbed by the adsorbent. Of course this selective adsorption takes place only when the temperature is not sufficiently high so that the impurities are driven out of the adsorbent. In the ordinary process of distillation the vapors are substantially saturated with respect to the imide, whereas in sublimation processes there is a certain amount of superheat as contact of the carrier gas with the imide is not sufficiently long to produce 100% saturation. However, the amount of superheat in sublimation processes is not very high and in the claims the expression "without material superheating" is intended to include the amount of superheat which is normally present in sublimation processes and which is not large enough to materially interfere with the selective adsorption of the impurities. This expression excludes using superheat so high that the impurities are not substantially adsorbed by the adsorbent.

What is claimed as new is:

1. A method of purifying sublimable aromatic imides having impurities whose vapor pressure is decreased by contact with adsorbents to a greater degree than the imide itself, which comprises subjecting the vapors of the impure imide without material superheating to the action of an adsorbent.

2. A method of purifying sublimable aromatic imides having impurities whose vapor pressure is decreased by contact with adsorbents to a greater degree than the imide itself included in the group phthalimide, naphthalimide, which comprises causing the vapors of the imide without the material superheating to contact with an adsorbent.

3. A method of purifying phthalimide having impurities whose vapor pressure is decreased by contact with adsorbents to a greater degree than the imide itself, which comprises causing the vapors of the phthalimide without material superheating to contact with an adsorbent.

4. A method according to claim 1, in which the adsorbent is also a condensation catalyst.

5. A method according to claim 2, in which the adsorbent is also a condensation catalyst.

6. A method according to claim 3, in which the adsorbent is also a condensation catalyst.

7. A method according to claim 1, in which the adsorbent is an aluminum oxide gel.

8. A method according to claim 2, in which the adsorbent is an aluminum oxide gel.

9. A method according to claim 3, in which the adsorbent is an aluminum oxide gel.

Signed at Pittsburgh, Pennsylvania, this 16th day of January, 1930.

ALPHONS O. JAEGER.